United States Patent Office 3,825,475
Patented July 23, 1974

3,825,475
PROCESS AND DEVICE FOR PRODUCING
MICROORGANISMIC MATTER
Alicia L. Compere-Whitney, Knoxville, Tenn., assignor to
Imperatrix, Palo Alto, Calif.
Filed Sept. 25, 1972, Ser. No. 291,766
Int. Cl. C12b 1/00
U.S. Cl. 195—104                              11 Claims

ABSTRACT OF THE DISCLOSURE

A substrate for rapidly growing a microorganism is disclosed. The substrate comprises a liquidophilic matrix having a high surface area. The matrix is adapted to retain a volume of liquid. The surface area of the matrix is sufficiently high to provide a ratio of the surface area available as a substrate to the volume of retainable liquid of at least 10 meter$^2$/liter. A process for producing a microorganism is also disclosed. The process comprises contacting a microorganism or its precursor in a suitable vessel with the high surface area liquidophilic matrix, sufficient liquid to wet the matrix, and essential nutrients, whereby desired products, often including additional microorganism, are produced.

BACKGROUND OF THE INVENTION

The invention relates to a process for the growth of microorganisms and to a substrate useful in said process.

The prior art discloses a number of processes and substrates for growing microorganisms. Representative prior art patents are U.S. Pats. 3,580,811; 3,509,026; 3,107,204; and 2,904,474. The above mentioned U.S. patents do not disclose to obtain rapid growth of a microorganism it is essential that the substrate used for growing the microorganisms have a ratio of surface area available as substrate to volume of liquid retainable by said substrate of at least 10 meter$^2$/liter. The above mentioned U.S. patents also do not show production of increased yields or rates of yield of microorganism.

In general, the prior art in the area of microorganism culture often depends upon mechanical aeration and/or the transfer of oxygen from ambient air into a relatively large volume of liquid in the case of aerobic microorganisms. In the case of anaerobic organisms, the prior art in the area of microorganism culture often depends upon mechanical agitation and/or the diffusion of metabolic waste gases from a large mass of a liquid out of the surface of said liquid.

Transfer of gases between the gaseous state and the liquid state is dependent upon both the area of the liquid-gas interface and upon the thickness of the liquid surface film through which the gases must pass. The prior art provides a large volume of liquid for every unit of gas-liquid interface area. The present invention on the other hand provides a very large amount of gas-liquid interface area for every unit volume of liquid retained.

The growth of aerobically cultured microorganisms is dependent upon the rate at which oxygen can be made to contact said microorganisms. The rate of growth of anaerobic microorganisms is often dependent upon the rate at which waste materials can be removed from the vicinity of said anaerobic microorganisms. Some of these waste products are gaseous, e.g. carbon dioxide.

Thus, it is an object of the present invention to provide a substrate comprising a high surface area liquidophilic matrix whereby when said substrate is used to grow microorganisms, a large gas-liquid interface area exists for every unit volume of liquid retained within the matrix.

It is a further object of the invention to provide a substrate on which microorganisms can be rapidly grown.

It is yet another object of the invention to provide an improved process for producing a microorganism at a more rapid growth rate.

It is a still further object of the invention to provide a substrate which accomplishes the above objects and which also includes a means for removing a product of said microorganism.

These and other objects of the invention are accomplished as set out hereinafter.

GENERAL DESCRIPTION OF THE INVENTION

The invention comprises both a new substrate for rapidly growing a microorganism and a new process for rapidly growing a microorganism. The substrate comprises a liquidophilic matrix having a high surface area. The matrix is adapted to retain a volume of liquid and to serve as a substrate for growing the microorganism. The surface area of the matrix is sufficiently high so as to provide a ratio of said surface area available as said substrate to said volume of retainable liquid of at least 10 meter$^2$/liter.

The process of the present invention comprises rapidly growing a microorganism by contacting an aliquot of the microorganism or a precursor thereof in a vessel with a liquidophilic matrix having a high surface area, sufficient liquid to wet said matrix, and essentially nutrients. The surface area of the liquidophilic matrix available to serve as a substrate for growing microorganisms must be sufficiently high so as to provide a ratio of said surface area available as said substrate to the volume of said liquid wetting said matrix of at least 10 meter$^2$/liter.

DETAILED DESCRIPTION OF THE INVENTION

When the term "liquidophilic matrix" is used herein, this term is meant to include any wettable, usually swellable, and preferably sterilizable matrix, the material of which will not adversely affect the growth of desired microorganisms. For example, the liquidophilic matrix can comprise an absorbent material such as absorbant plastic, absorbant paper, fibers, fabric and other absorbant cellulosic materials, or the like.

When the term "microorganism or precursor thereof" is used herein, the term is used to include bacteria, yeast, unicellular fungi, unicellular protozoan parasites, unicellular algae, unicellular spores, and viruses including dryed aliquots of these materials which on contact with liquid and essential nutrients will start to produce growing microorganisms. In one embodiment of the invention, a precursor of a microorganism is included with said substrate.

When the term "surface area available as a substrate" is used herein, the term is meant to include both the external and a portion of the internal area of the liquidophilic matrix, only that portion of the internal area being included within the term as (1) is wetted by the liquid and (2) wherein the liquid wetting said portion of the internal area is contactable with a gas. In other words, the surface area within small capillaries that completely fill with liquid, to the exclusion of gas, are not included in the "surface area available as a substrate."

When the term "retainable liquid" is used herein, the term is meant to include the liquid which is retainable by the matrix when the matrix is contacted with an excess of liquid. The term thus includes all retainable liquid.

When the term "essential nutrients" is used herein, the term is used broadly to include foods, inorganic salts, and the like.

As has been alluded to briefly above, it is essential to the successful practice of the process of the present invention and to the usefulness of the substrate of the present invention for rapidly growing and/or supporting a microorganism that the surface area of the liquidophilic matrix be high enough to provide a ratio of that portion of said surface area available as a substrate to the volume of liquid retainable by said matrix of at least 10 meter$^2$/liter, more preferably at least 50 meter$^2$/liter and still more preferably at least 100 meter$^2$/liter. Only with such a high ratio of surface area to volume of retainable liquid will the substrate be useful for rapidly growing a microorganism since only with this high of a ratio will oxygen, e.g. air, be able to rapidly contact aerobic microorganisms or will waste gases be able to escape from the vicinity from an aerobic microorganisms. Further, an aerobes need large available surface area since they must be attached to their substrates.

It will be both desirable and possible in the case of some microorganisms to recover a pharmaceutically active substance produced by the microorganisms, e.g., a useful metabolic waste product or a virus which perhaps feeds upon other microorganisms such as bacteria, from the substrate of the invention as, for example, by extracting the substance into a liquid having an affinity for said substance, which liquid is separable from the liquid in which the microorganism is being cultured, absorbing or adsorbing the substance onto a solid material having an affinity for the substance, removing the substance through a semi-permeable membrane which selectively passes said substance, or by other equivalent means for removing a desired product.

BRIEF DESCRIPTION OF THE DRAWING

The invention will be better understood by reference to the accompanying drawings.

DESCRIPTION OF THE PREFERRED EMBODIMENT

Figure 1:
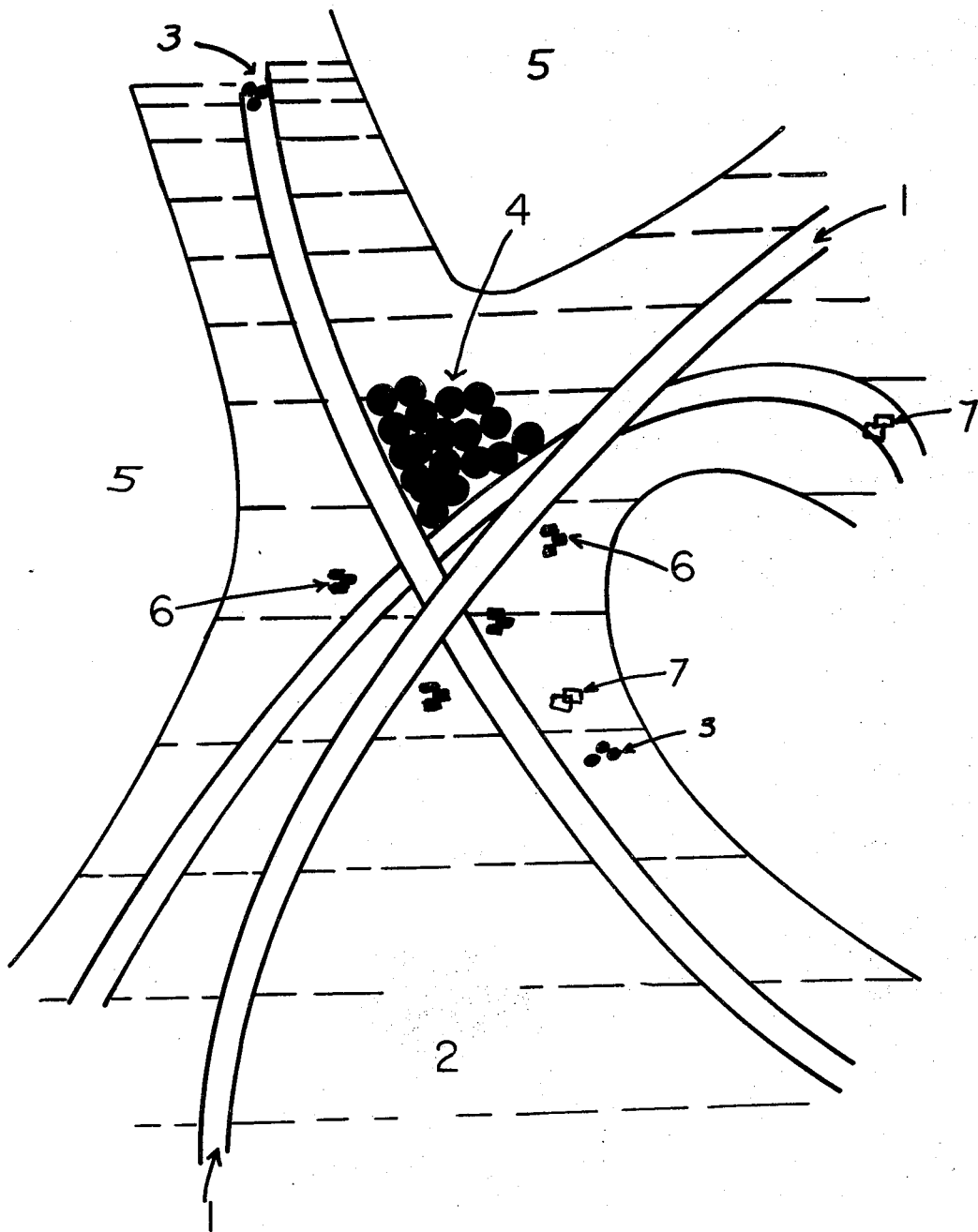
FIG. 1 illustrates in perspective view a section of the substrate of the present invention in contact with a liquid and microorganisms.

Briefly and referring to the FIG. 1, a substrate is provided for rapidly growing a microorganism. The substrate comprises a liquidophilic matrix 1 having a high surface area. The matrix is adapted to retain a volume of liquid 2 and at least a portion of the surface of said liquidophilic matrix serves as a substrate for growing microorganisms.

Since the matrix 1 is liquidophilic, it is adapted to retain a volume of liquid 2. The surface area of the matrix is sufficiently high so as to provide a ratio of the surface area available as said substrate to the volume of retainable liquid of at least 10 meters$^2$/liter.

Referring to FIG. 1, the matrix 1 is shown as a porous material in contact with a liquid 2 retained on the surface thereof. Microorganisms 4 are shown growing on that portion of the surface of the liquidophilic matrix useful as a substrate for growing said microorganisms. Also shown are essential nutrients 3 which may be included within said matrix, a metabolic waste absorbant material, e.g., activated charcoal 6, which in the embodiment of the invention shown is included with said matrix, and a gas 5, which is not harmful to said microorganisms and is in contact with the liquid retained by said matrix. Further, chemicals 7 for buffering the pH of the matrix are shown as included therewith.

Figure 2:
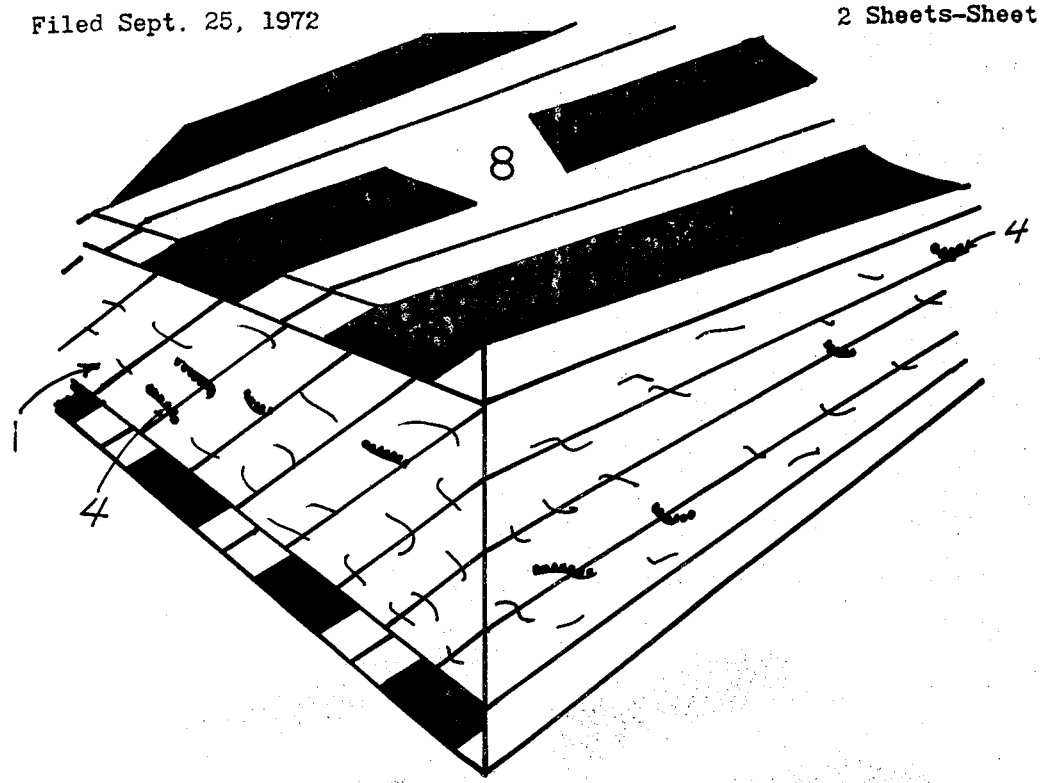
FIG. 2 illustrates a section of the substrate of this invention in contact with a semi-permeable membrane.

Referring now to FIG. 2, a section of the substrate of the invention is shown in contact with a semi-permeable membrane 8 through which desired product can be removed from said matrix. In this embodiment it is clear that only a portion of the total exterior surface area of the liquidophilic matrix 1 is available for use as the substrate. Alternatively the material 8 could comprise a material with an affinity for a particular product of the metabolism of the microorganism being grown on the substrate. As yet another embodiment the material 8 could comprise a clear plastic material through which microorganism growth or the concentration of a desired product can be observed in situ.

The process of the present invention is a process for rapidly growing microorganism and/or growing microorganism in improved yield. The process comprises contacting an aliquot of a microorganism or a microorganism precursor material in a vessel with a high surface area liquidophilic matrix, sufficient liquid to wet the matrix, and essential nutrients. It is to be understood that in some embodiments of the invention only a portion of the surface of the liquidophilic matrix is useful as a substrate for growing the microorganism. Such would be the case, for example, when a portion of the surface of the matrix was covered with a selectively permeable membrane or with a material having an affinity for a particular product produced by the microorganism.

In general, at least a portion of the microorganism produced in the processes will be recovered from the vessel. In some cases, the recovered microorganism will itself be a desired product and will be useful, for example, as an animal feed or as an animal feed additive. In other embodiments of the invention, the desired product may be a by-product of the metabolism of the microorganism in which case the excess microorganism grown by the process of the present invention can simply be discarded or can be used as a by-product.

When dealing with aerobic microorganisms the contacting will take place in the presence of a gas comprising oxygen e.g. air. When the microorganism being produced is anaerobic, the gas will be substantially oxygen free.

When the microorganism comprises algae, the gas will generally comprise both oxygen and carbon dioxide, the carbon dioxide being necessary to photosynthesis.

The invention will be better understood by reference to the illustrative examples which follow. It is understood that these examples are meant to be illustrative only and in now way limit the herein disclosed invention.

EXAMPLES

Example 1: Growth of Bacteria

A total of 8 screw capped 18 mm. by 150 mm. culture tubes were prepared, each containing different amounts of Difco brand "Bacto" (trademark) nutrient broth. The approximate amounts of nutrient broth in each of the 8 tubes are as given in Table I. Each of the culture tubes was autoclaved at 121° C. for 10 minutes. Each of the tubes was inoculated with a *Serratia marcesceans* strain obtained from Ward's Natural Science establishment (catalog #933). The bacterial medium was prepared in two concentrations, one and five times the recommended strengths, respectively (see Table I).

To test the hypothesis that increased oxygen transfer and increased bacterial substrate surface area increase the amount of bacterial growth tubes 4 and 8, as indicated in Table I were provided with one gram each of a nylon wool hydrophilic matrix having a surface area high enough to provide a ratio of the surface area available as a substrate to the volume of retainable liquid of more than 10 meter$^2$/liter. The tubes were incubated at room temperature in an upright position for 10 days at room temperature (about 25° C.) with no agitation. Following this period, the contents of each tube was individually filtered through a glass fiber filter of known weight. The filters were each dryed at 100° C. overnight and the bacterial growth in each tube was determined by measuring the increase in weight of each filter.

Some difficulty was encountered in removing all of the bacterial mass from the nylon wool in tubes 4 and 8 since a portion of the bacterial mass was retained on internal surfaces of the nylon wool. As a result, the measured solids values for these two tubes as given in Table I are believed to be lower than the actual solids values.

TABLE I

| Tube number | Volume of broth concentration | Gram/liter bacterial solids |
|---|---|---|
| 1 | 1X | .080 |
| 2 | 1X | .090 |
| 3 | 1X | .064 |
| 4* | 1X | .133 |
| 5 | 5X | .190 |
| 6 | 5X | .045 |
| 7 | 5X | .053 |
| 8* | 5X | 2.000 |

*Nylon wool added (1 gram).

Although the results for tube 4 are ambiguous because of the problem mentioned above, it is very clear from the results with tube 8 that an order of magnitude improvement in growth rate of bacteria has been achieved by increasing oxygen transfer through providing a high surface area liquidophilic matrix (nylon) to serve as a portion of the substrate for bacteria growth.

Example 2: Growth of Yeast

A solution was prepared from 10 grams of black strap molasses, one gram of "Bacto" peptone, and one gram of dried Pacific Ocean sea salts (obtained from Leslie Salt Co.), diluted to 100 ml. The solution was autoclaved at 121° C. for 20 minutes. After cooling, 15 ml. of this solution was placed in a sterile plastic 100 mm. petri dish containing a 2 inch by 2 inch by ⅓ inch piece of plastic sponge hydrophilic matrix (ratio of surface area available as a substrate to volume of retainable liquid of more than 10 meter$^2$/liter) and was inoculated with a culture of Saccharomyces cerevisia, common baker's yeast, prepared from activated dry yeast purchased at a grocery. Another 10 mm. of the same solution was placed in a one inch by 3 inch plastic snap-cap vial, inoculated with the same amount of the same yeast, and the vial was filled to within ⅛ inch of the top with distilled water and was capped. Both samples were incubated one week at 35° C. The cultures were removed from the culture vial and sponge by rinsing with distilled water and were individually filtered through tared glass fiber filter papers. The two filters were dried overnight at 100° C., cooled, and weighted. The culture grown using the sponge had a dry weight suspended solids value at 122.2 mm. per 15 ml. or 8,147 mg./liter. It is believed that this value is somewhat low due to the retention of some yeast cells inside the interstices of the sponge. The culture grown in the vial, which was limited in air transfer, had a dry weight suspended solids value of 63.2 mg. per 10 ml. or 6 6,320 mg./liter.

This example shows the usefulness of the substrate of the present invention (the plastic sponge) and the process of the present invention in providing increases yield of edible yeast.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A process for rapidly growing a microorganism, comprising:
    contacting without agitation a microorganism or a precursor thereof in a vessel with a high surface area liquidophilic matrix, said matrix being adapted to retain a volume of liquid and at least a portion of the surface area of said matrix being adapted to serve as a substrate for microorganisms, the surface area of said matrix available as said substrate being sufficiently high so as to provide a ratio of said surface area available as said substrate to said volume of retainable liquid of at least 10 meter$^2$/liter, sufficient liquid to wet said matrix, and essential nutrients.

2. A process as in Claim 1, including as an added step: Recovering from said vessel at least a portion of the microorganism produced therein.

3. A process as in Claim 1 including as an added step contacting said matrix with a material which removes a virus from said microorganism.

4. A process as in Claim 2, wherein said contacting takes place in the presence of a gas that is not harmful to said microorganism.

5. A process as in Claim 4, wherein said gas comprises oxygen and said microorganism is aerobic.

6. A process as in Claim 4 wherein said gas is substantially oxygen free and said microorganism is anaerobic.

7. A process as in Claim 1, including as an added step: Removing a metabolic product of said microorganism.

8. A process as in Claim 7, wherein said metabolic product is removed by the use of a selectively permeable material.

9. A process as in Claim 7 wherein said metabolic product is removed by contacting said matrix with a material having an affinity for said product.

10. A process as in Claim 7 wherein said metabolic product is pharmaceutically active.

11. A process as in Claim 7, wherein said metabolic product comprises a metabolic waste.

References Cited

UNITED STATES PATENTS 3,740,321   6/1973   Pogano et al. _____ 195—139
3,532,605   10/1970  Riera _____ 195—139

A. LOUIS MONACELL, Primary Examiner

R. J. WARDEN, Assistant Examiner

U.S. Cl. X.R.

195—100, 102, 108